UNITED STATES PATENT OFFICE.

EDWARD M. CAFFALL, OF BALTIMORE, MARYLAND, ASSIGNOR OF ONE-HALF TO CHARLES W. JACKSON, OF SAME PLACE.

PROCESS OF PRESERVING ARTICLES OR STRUCTURES.

SPECIFICATION forming part of Letters Patent No. 520,819, dated June 5, 1894.

Application filed September 6, 1893. Serial No. 484,896. (No specimens.)

*To all whom it may concern:*

Be it known that I, EDWARD M. CAFFALL, a citizen of the United States, residing at Baltimore, in the State of Maryland, have invented certain new and useful Improvements in Processes of Preserving Articles or Structures; and I do hereby declare the following to be a full, clear, and exact description of the invention, such as will enable others skilled in the art to which it appertains to make and use the same.

My invention relates to the preservation and protection of metal and wood surfaces, such as the bottoms of metal or wooden vessels, painted or unpainted, and buoys, iron piers, wooden piles, wharves, quays and any and all like structures that are exposed to the action of fresh or salt water, and the destroying action of marine insects contained in such water.

My invention consists of the process of preserving articles or structures exposed to the action of water and insects, which I shall hereinafter fully describe and specifically claim.

In carrying out my invention I apply an ordinary painter's stove or blast lamp to the surface until a heat approximating 350° Fahrenheit is obtained; then I apply, by means of a brush a coating of zietrisikite or other natural mineral wax, and add a second coating of refined heated asphaltum, which, as soon as it is cooled to a temperature of about 212° Fahrenheit, is ready to receive an exterior coating of zietrisikite or other natural mineral wax, applied while in a heated liquid condition; the surface, thus coated, being kept warm, if necessary by holding the stove or blast lamp at a suitable distance until the wax and asphaltum become thoroughly amalgamated and form a smooth surface.

When small articles of metal or wood, or separate beams or plates that are capable of being readily handled are to be treated, I prefer to immerse them in a tank of melted asphaltum, after previously heating them in a suitable oven to a temperature approximating 350° Fahrenheit, and on removing them from the tank I allow them to drain and cool to a temperature of about 212° Fahrenheit, I then immerse them in a tank of heated zietrisikite or other natural mineral wax and on taking them out allow them to drain and the whole surface made to amalgamate and form a smooth exterior by the application of a gentle heat thereto, if the same becomes necessary.

The zietrisikite, ozocerite and other natural mineral waxes of this class are especially adapted for my purposes, and they are also especially useful in resisting the action of the sun on account of their high melting point.

To apply the material to the bottoms of vessels, piles driven into salt or fresh water for wharves, quays, ferry-slips and for preserving any article subjected to the injurious action of marine insects and salt water, I first melt it in a suitable vessel and apply it to such surface with a brush or by other suitable means, after first heating said surface, and then I take an ordinary painter's stove or blast lamp and hold it a suitable distance from the surface to heat the latter until the material has sufficiently impregnated the surface.

If articles, while cold, are coated with ordinary manufactured paraffine or waxes of the same class, the heat of the sun will melt them and cause them to flow, and if paint is used on such metal or wooden surface it will peel off when exposed to the heat of the sun, but zietrisikite, ozocerite and natural mineral waxes of a similar nature that retain their hardness until a heat of about 190° Fahrenheit, before softening, will remain firm under ordinary atmospheric condition; this being more apparent when the material is applied to a heated surface in contradistinction to one that is cold.

Having thus described my invention, what I claim as new, and desire to secure by Letters Patent, is—

1. The process herein described of preserving articles and structures exposed to action of water and insects, which consists, essentially, in applying successive coats or layers of asphaltum and zietrisikite to said articles or structures, and subsequently combining said materials *in situ* by heat.

2. The process herein described of preserving articles and structures exposed to the action of water and marine insects, which consists, in first heating the surface of the article or structure, then applying a coating of zietrisikite or other natural mineral wax, then applying a coating of refined melted asphaltum, and finally applying a second coating of zietrisikite or other natural mineral wax and heating the exterior surface to cause the wax and asphaltum to amalgamate.

In testimony whereof I affix my signature in presence of two witnesses.

EDWARD M. CAFFALL.

Witnesses:
T. W. FOWLER,
CHAPMAN FOWLER.